Figure 1:
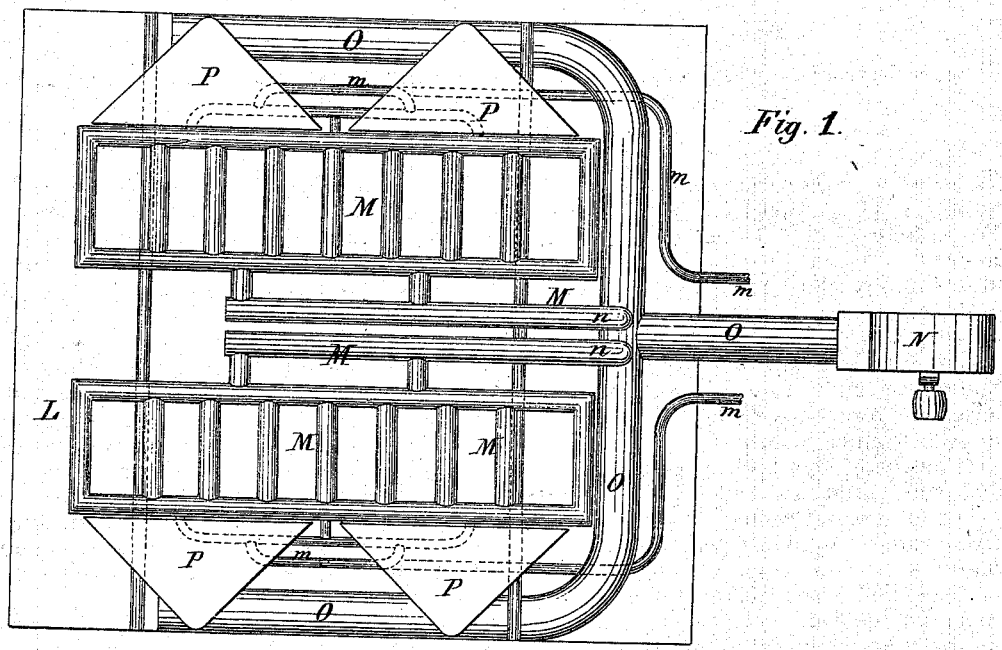

A. MÜHL.
Apparatus for Cooling the Air of Buildings.

No. 146,267.  Patented Jan. 6, 1874.

UNITED STATES PATENT OFFICE.

ANDREW MÜHL, OF WACO, TEXAS.

IMPROVEMENT IN APPARATUS FOR COOLING THE AIR OF BUILDINGS.

Specification forming part of Letters Patent No. 146,267, dated January 6, 1874; application filed December 8, 1871.

*To all whom it may concern:*

Be it known that I, ANDREW MÜHL, of Waco, county of McLennan and State of Texas, have invented certain new and useful Improvements in Ventilating and Cooling Rooms and other structures, of which the following is a specification:

The improvements herein described are intended especially to meet the wants of distilleries and breweries, though they may be used in other connections.

It has heretofore been suggested to ventilate and cool buildings and other structures by means of air first cooled by passing over a series of pipes containing ether or other freezing liquid, such as is employed in ice-making apparatus, and then blowing this air into the room to be cooled. Such a method is described, for instance, in the patent of Tellier, No. 85,719, of January 5, 1869. The objection to this, however, is that there cannot be the necessary circulation and equably cool temperature maintained in the room; nor is there the requisite provision made for condensing the vapor that may be in the room into which the previously-cooled air is blown.

It has also been suggested to arrange ether-pipes in various positions in the room to be cooled, whereby the temperature therein may be reduced to a low temperature. But under this arrangement the air would not be equably cooled, portions of the air remote or at a distance from the pipes being of a much higher temperature than other portions immediately surrounding the pipes; and, moreover, the ventilation would be defective by reason of there being no provision made for renewing the air in the room, or for keeping up a constant circulation of the air within the room.

My invention is intended to obviate these and other objections which have attended the methods heretofore suggested; and, to this end, I combine a series of pipes containing the refrigerating fluid, arranged within the room, and a little below the ceiling of the same, and a blowing or air-forcing apparatus, so arranged as to discharge air over or upon the horizontal layer of refrigerating-pipes. By this arrangement a positive circulation is maintained; the arrangement of the series of pipes is such as to bring them in contact with the upper, and consequently warmer, portion of the air in the room; the condensation of whatever moisture there may be in the atmosphere is perfectly effected; ventilation is provided for, and an equable temperature is maintained, the air discharged from the air-forcing apparatus over and upon the pipes, being cooled, deprived of moisture, and consequently falling to the bottom of the room, displacing other and warmer air, which rises, is brought in turn in contact with the pipes, is thoroughly agitated by the action of the air-forcing apparatus, and, being in its turn deprived of moisture and refrigerated, descends again to the floor, thus keeping up a constant circulation, and equalizing, as far as possible, the temperature in all parts of the room.

The accompanying drawing represents the manner in which my invention is or may be carried into effect.

Figure 2:
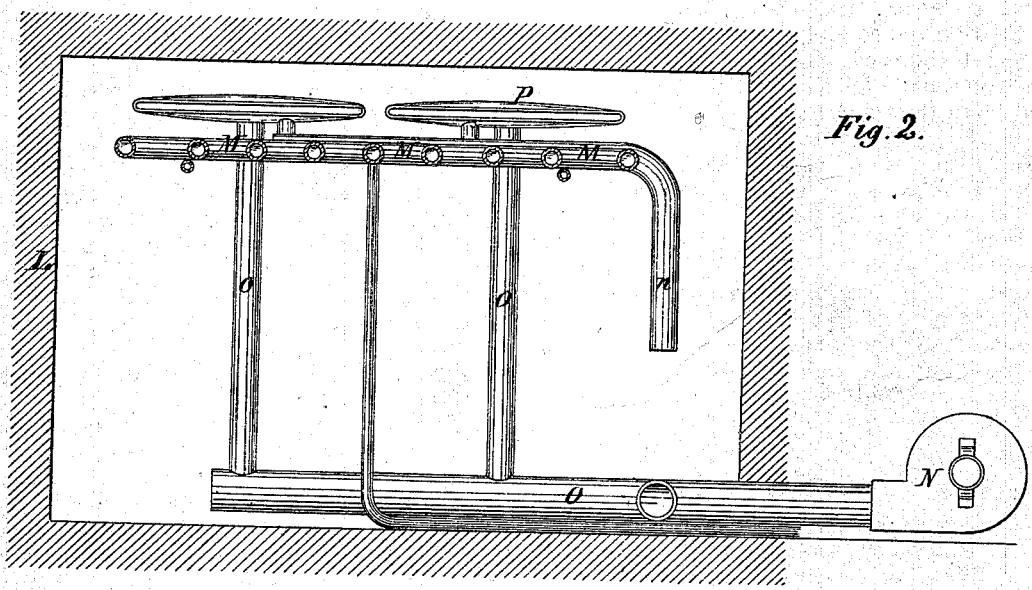

Figure 1 is a plan view of the apparatus arranged in a compartment, the top or roof of which is removed to allow the apparatus to be seen. Fig. 2 is a longitudinal vertical section of the same.

The apparatus is represented as placed in an apartment or chamber, L. It consists of a congeries of pipes or tubes, M, arranged about parallel with and a little below the ceiling of the room. Into these pipes the liquid or fluid from the source of supply is conducted through one or more suitable pipes, $m$, and, flowing through the pipes M, passes out through the return pipe or pipes $n$. I may here say that the fluid I prefer to use is methylic ether, methylichlorhydric ether, or other freezing agent which liquefies at a very low temperature, say two degrees below zero, and with a comparatively small pressure; and the circulation of this fluid through the pipes M is maintained by means of the apparatus patented to me on the 28th November and 12th December, 1871. The congeries of pipes M, in the present instance, have the position occupied by the freezing box or vessel in those patents, and the circulation of the ether, and its passage to, into, and from the refrigerating-pipes M, takes place precisely as it does in the case of the freezing-vessel in the patented apparatus referred to. I prefer to use said patented apparatus, as I am enabled to obtain good results at far less expense than with other forms of apparatus. The ether enters the pipe M in the form of liquid, and, parting with its cold in cooling the air surrounding the pipes M, it is raised to a higher temperature, and, consequently, by the time it reaches the return-pipe $n$ it has expanded into vapor. For this reason, therefore—that is, in order to accommodate the increased volume of the ether—the return-pipe $n$ is made, as shown in the drawing, of greater diameter than the inlet-pipe $m$. A blowing or air-forcing apparatus, N, drives ordinary atmospheric air through the air-pipes O, by which the air is conducted up above the cooling-pipes M, over and upon which it is blown or discharged through nozzles or mouths P. By this forcible contact with the cooling-pipes the air is cooled, its moisture is condensed, and it consequently descends, displacing the warmer air, which rises, and in turn is cooled and descends. I thus keep up a constant circulation, maintain an equable temperature, condense the moisture, and maintain a thorough ventilation, and, what is of the greatest importance, cool the air to a much lower degree in all parts of the room than has heretofore been practicable.

Having thus described my invention, what I claim, and desire to secure by Letters Patent, is—

1. The mode herein described of ventilating and cooling chambers of buildings and other structures by arranging the refrigerating-pipes in the upper part of the chamber to be cooled, and blowing air over and upon said pipes, substantially in the manner shown and set forth.

2. A series of refrigerating-pipes arranged in the apartment to be cooled in a plane about parallel with and a little below the ceiling of the same, in combination with air conduits or tubes connected with an air-forcing apparatus, and discharging air over and upon said refrigerating-pipes, substantially as shown and described.

In testimony whereof I have signed my name to this specification before two subscribing witnesses.

A. MÜHL.

Witnesses:
M. BAILEY,
C. B. NOTTINGHAM.